United States Patent [19]

Hongo

[11] Patent Number: 4,956,648

[45] Date of Patent: Sep. 11, 1990

[54] DOT POSITION DISCREPANCY CORRECTING CIRCUIT FOR PRINTING APPARATUS

[75] Inventor: Yutaka Hongo, Tokyo, Japan

[73] Assignee: Seiko Instruments, Tokyo, Japan

[21] Appl. No.: 375,485

[22] Filed: Jul. 5, 1989

[30] Foreign Application Priority Data

Jul. 5, 1988 [JP] Japan ................................ 63-168432

[51] Int. Cl.[5] ............................ G01D 15/6; B41J 3/04

[52] U.S. Cl. ................................ 346/1.1; 346/140 R; 358/75; 400/126

[58] Field of Search .......................... 346/140, 1.1, 75; 358/75; 400/126, 118

[56] References Cited

U.S. PATENT DOCUMENTS 4,364,060 12/1982 Jinnai .................................. 346/75

4,675,696 6/1987 Suzuki ............................ 346/140 X 4,709,248 11/1987 Piatt .................................. 346/140

4,716,421 12/1987 Ozawa ................................ 346/140

*Primary Examiner*—Joseph W. Hartary

*Attorney, Agent, or Firm*—Spensley Horn Jubas & Lubitz

[57] ABSTRACT

A printer driving circuit for a printer having a printer head which is mounted to scan perpendicularly to a direction in which a sheet to be printed upon is fed, the printer head including a plurality of dot printing units arranged on the head so that the units are spaced from one another by respective separation distances in the direction of head scanning, the printer driving circuit includes: a detector for detecting the position of the head; a picture memory for storing print data associated with at least one scan by the printer head at addresses corresponding to printed pixel locations on the sheet; a position generator coupled with the detector for generating information related to respective positions of the printing units on the sheet; a read out device coupled with the detector for reading out the pixel data stored in the picture memory at addresses corresponding to the positions of the printing units relative to the sheet; a timing generator coupled with the position generator for generating a plurality of printing timing signals and having a timing selector to select one of the printing timing signals in accordance with the information related to the respective positions of the printing units, and a driving device coupled with the read out device and the timing generator for driving the printing units according to the pixel data read out by the read out device in response to the input of the selected timing signal.

33 Claims, 7 Drawing Sheets

FIG. 2
TIME
VALUE OF DECIMAL PART
7
6
5
4
3
1
0
W
TIMING SIGNALS
$T_0$
$T_1$
$T_2$
$T_3$
$T_4$
$T_5$
$T_6$
$T_7$

DOT POSITION DISCREPANCY CORRECTING CIRCUIT FOR PRINTING APPARATUS

BACKGROUND OF THE INVENTION

The present invention relates to a circuit for correcting the printing dot positions of a printer apparatus which produces printed material by means of a head having a plurality of on-demand type ink jet spray nozzles.

In a conventional printer having a head including a plurality of ink jet nozzles so arranged on the head that they are separated from one another in the direction of head scanning, a correction method of this kind uses a shift register, or the like. In such a method, it is clear that the correction can be made in dot pitch unit steps only, and steps of separating distances are required, which is not efficient. Also, there is a method that delays the printing timing of the nozzle which is trailing to the scanning direction of the head for a time corresponding to the separating distance thereof. This method has the drawback that the relationship between the distance and the time must be maintained extremely precise. When it is considered in combination with the trend toward miniaturization which reduces the dot pitch, the maintenance of the constant speed property of the head scanning requires extremely high costs.

Although the technical development of the multinozzle is in progress in correspondence to the market request for high densification, high speed printing, and colored printing, a structure constituting a plurality of nozzles united in one body in a plane in a designated high density pitch has not yet been developed, and the present technology is at a point where a head is formed by combining a number of heads. Therefore, in order to counteract manufacturing inaccuracies, it is necessary to correct arbitrary nozzle intervals. When the conventional technology is considered in view of the point described above, it is deficient with regard to flexibility of the correction length, and since its greatest weakness is that the reference is reversed in dependence to the scanning direction of the head, it is difficult to have dots formed during forward movement and dots formed during return movement formed in a line, although correction could be made for each direction of movement and, in the actual case, the printing is limited in one direction only, so that the printing time becomes long.

The present invention intends to overcome the weak points of the conventional technology and to provide a correcting method having high precision, and to realize an apparatus having high printing quality.

SUMMARY OF THE INVENTION

It is therefore an object of the invention to provide a printer driving circuit which corrects the printing position discrepancy of a plurality of nozzles having arbitrary separating distances in the scan direction of the head.

It is another object of the invention to provide a printer driving circuit having a high precision discrepancy correction function in the detecting resolution unit of a position encoder of the print head without high stability of the scanning speed of the head.

It is a further object of the invention to provide a printer driving circuit which corrects the dot position discrepancy in both the forward scanning direction and the return scanning movement.

These and other objects of the invention are accomplished by providing a position detecting means for a reference nozzle, a coordinate counter for counting the output signals of the position detecting means, correction registers for storing respective correction values for the forward scanning movement and the return scanning movement of each nozzle, selecting means for selecting one of the correction registers, an adder for adding the output of the selected correction register to the output of the coordinate counter to make an address value of a pixel data stored in a memory, a timing generator, a timing selector for determining the printing timing of the nozzles other than the reference nozzle from the output of the timing generator and the output of the correction registers.

The separating distance L between the reference nozzle and the other nozzles can be represented as follows:

$$L = l \times D + m \times d \quad \text{(Eq. 1)}$$

wherein d is the resolution of the position detecting means, D is a dot pitch, such that $D = n \times d$, l and m are integers, n is an integer greater than 2, and $m < n$.

Also, Eq. 1 can be represented as $$L = (l+1) \times D - (n-m) \times d \quad \text{(Eq. 2)}$$

In dependence on the positional relationship to the reference nozzle and depending on whether it is in the forward movement phase or the return movement phase, Eq. 1 or Eq. 2 is selected to be used in the correction value for each nozzle. The coefficient of D, i.e., l is the value obtained by adding the address values of the memory in which the pixel data of the reference nozzle are present to the amount of the coefficient of D taken as the reading address value of the pixel data of the nozzle, and the read out is performed. Also, the coefficient of d, i.e., m, is the correction term of the position detecting means in the resolution unit, and indicates the fine correction amount less than the dot pitch. Concretely, the printing position is displaced from the printing position of the reference nozzle by the amount corresponding to the coefficient of d. When described in time series, it means the process of providing printing timing delay. The correction register stores the correction coefficients described above, including an integer part and a decimal part. The integer part corresponds to the coefficient of D and the decimal part to the coefficient of d. The coordinate counter also contains similarly the integer part and the decimal part. The added value of the value of this integer part and the value of the integer part of the correcting resistor become the address value for reading out the pixel data of the nozzles to which correction is applied. Also, printing timing delay is effected from these decimal parts.

DESCRIPTION OF PREFERRED EMBODIMENTS

In the following, preferred embodiments of the present invention will be explained with reference to the drawings.

Figure 1:
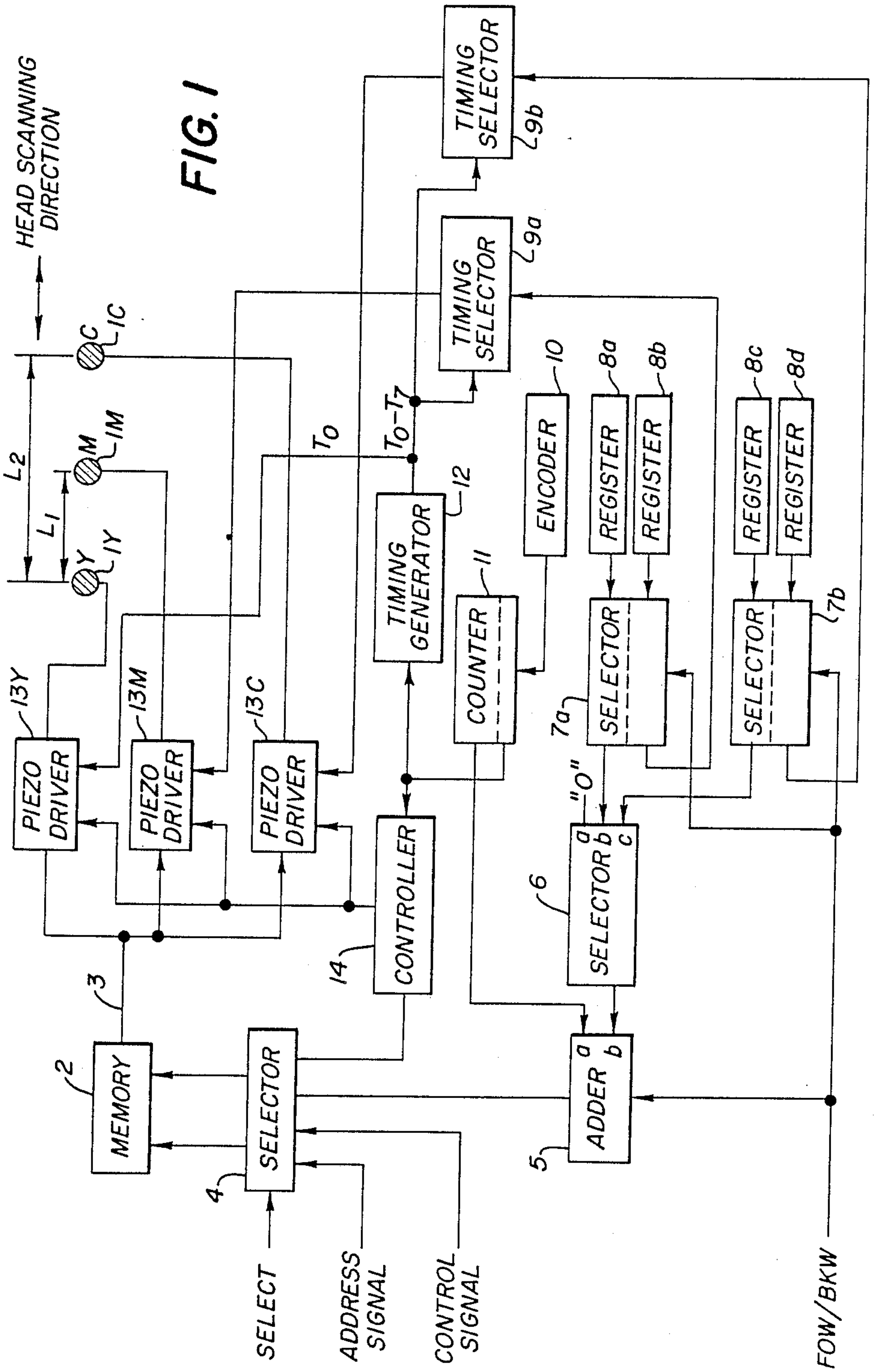
FIG. 1 is a block diagram of a printing apparatus having a dot position discrepancy correcting circuit according to the invention.

The circuit shown in FIG. 1 is provided for a head carrying, against the paper sheet, a nozzle for yellow ink 1Y, a nozzle for magenta ink 1M, and a nozzle for cyan ink 1C in a line in the head scan direction, with a separation distance L1, L2 from the nozzle 1Y. In this example, the nozzle 1Y is taken as the reference nozzle, and a position detector encoder 10, which is a head scan driving source and is installed on the rotation axis of a DC motor (not shown), is adjusted and installed to detect the position of nozzle 1Y. The output pulse of the encoder 10 is calculated by the coordinate counter 11, and the count value thereof shows the coordinate value of the nozzle 1Y.

Each output pulse from encoder 10 corresponds to one unit of d, where $d=1/n\times D$ (n is an integer of more than 2), when the printed dot pitch on the paper sheet is taken as D. Now, in order to make the explanation easier to be understood, it will be based on the assumption that $n=8$. When the relation is taken as such, it follows that, when the head displaces in the direction of forward scanning movement, which is that direction in FIG. 1 where cyan ink head 1C is leading, the output pulse of the encoder 10 is inputted to the coordinate counter 11 as an up count pulse, and a scan displacement of the amount of 1 dot pitch can be taken to be carried out when 8 pulses have been produced. Although it is also carried out in the same manner in the case of return, or reverse, scanning movement, the encoder pulses are then inputted as down count pulses. Coordinate counter 11 is shown divided with a broken line into two parts, which are an upper integer part and a lower decimal part. If $n=8$, the decimal part has 3 bits ($2^3=8$). This is because, considering the dot pitch D unit, the input of 0 to 7 pulses in d units does not equal D, so it is taken as the decimal part. Since the count bits in bit positions 4 and above indicate the coordinate value of the D unit, they are taken as the integer part.

Next, the circuit includes correction registers 8a to 8d, whose stored values can be set as follows. At first, it is assumed that $L_1$ can be represented by the formula $L_1=2\times D+3\times d$, then the value in correction register 8a for the forward movement of nozzle 1M is obtained by using the above formula Eq. 2 in such a manner as $L_1=3\times D-5\times d$, and the coefficients of D and d obtained are set as the combination (3, 5). For the correction register 8b for the reverse movement, the original coefficients are used (2, 3). The left term in the parentheses indicates the integer part, the right term the decimal part.

Similarly, when it is assumed that $L_2$ can be represented as $L_2=3\times D+d$, the values (4, 7) are set in correction register 8c for forward movement of nozzle 1C, and the values (3, 1) in correction register 8d for the reverse movement. This is, as shown in the present embodiment, in the case when the reference nozzle is positioned at the left, Eq. 2 is used for the forward movement and Eq. 1 for the reverse movement. The output of correction registers 8a to 8d are inputted into the selectors 7a and 7b, and the correction register outputs are selected by a signal FOW/BAK which indicates whether the present scanning direction of the head is forward or reverse. For example, for forward movement, the correction registers 8a and 8c are selected. Selectors 7a and 7b are shown with a broken line to show, in the same manner as in the coordinate counter 11, the division of an output into an integer part and a decimal part.

The memory 2 stores picture, or image, data at addresses corresponding to printed pixel locations on the sheet.

Next, the selector 6 and the adder 5 belong to the mechanism for forming address signals for addressing memory 2 in the case when pixel data are read out. By the selection signal given from the control circuit 14, the selector 6 connects one of the inputs a, b and c to the adder 5. At first, the pixel data read out address of the reference nozzle 1Y is obtained from the integer part itself of the coordinate counter 11, and the memory address value is obtained by adding the value 0 to the output of counter 11. Next, the pixel data read out address of the nozzle 1M can be obtained by adding, in adder 5, the read out address value of the nozzle 1Y from counter 11, the value of the output of the integer part of 8a or 8b, that is, the value of the output of the integer part of the selector 7a. Similarly, in the case of the nozzle 1C, the output of the integer part of the selector 7b is selected by the selector 6, and the read out address value of the presently required pixel data is obtained.

The selector 4 effects the switch-over of the signal generated by the pixel data writing circuit (not shown) and the signal for reading out the pixel generated by the control circuit 14 and the adder 5. Of course, during printing, the output signals of the control circuit 14 and the adder 5 are connected to the memory 2. The pixel data signal 3 as the output of the memory 2 is connected to the piezo driving circuits 13Y, 13M and 13C provided for operating respective nozzles. The memory 2 includes a three plane memory for respective colors used to print a full color picture, that is a yellow memory plane, a magenta memory plane and a cyan memory plane. The control circuit 14 selects one of the planes through selector 4 synchronized with outputting the selection signal to the selector 6. This selection is achieved by providing a two bit selection signal as a part of the address value. By the way, the nozzle on the circuit and the piezo element are viewed as a unit. Respective piezo driving circuits 13Y, 13M and 13C store the pixel data respectively under control of the control signal of the control circuit 14, and wait for the predetermined printing timing.

Figure 2:
FIG. 2 is an diagram showing the relationship, during forward movement, between outputs of a timing generator and the values of the coordinate counter decimal part.

On the other hand, as shown in FIG. 2, the timing generating circuit 12 forms respective signals $T_0$ to $T_7$. From the moment when the decimal part of the coordinate counter 11 has changed, there are produced pulses having a predetermined width. This pulse width W is determined to be a time width sufficient to drive the piezo elements. $T_0$ is uniquely determined as relating to the reference nozzle, that is, as one which operates the nozzle 1Y, and in FIG. 1, the signal transmitted from the timing generating circuit 12 to the piezo driving circuit 13Y is $T_0$.

Further, FIG. 2 will be explained, with reference to a forward scanning movement phase, in which it is known that, as time elapses, the value of the decimal part of the coordinate counter 11 increases in the manner of 0, 1, 2 to 7. Further, although the description assumes that the time intervals for transferring from 0 to 1, 1 to 2, 2 to 3, etc., are identical, it is of no importance if they vary. This is, the stability of the scanning speed of the head is not necessarily required.

Figure 3:
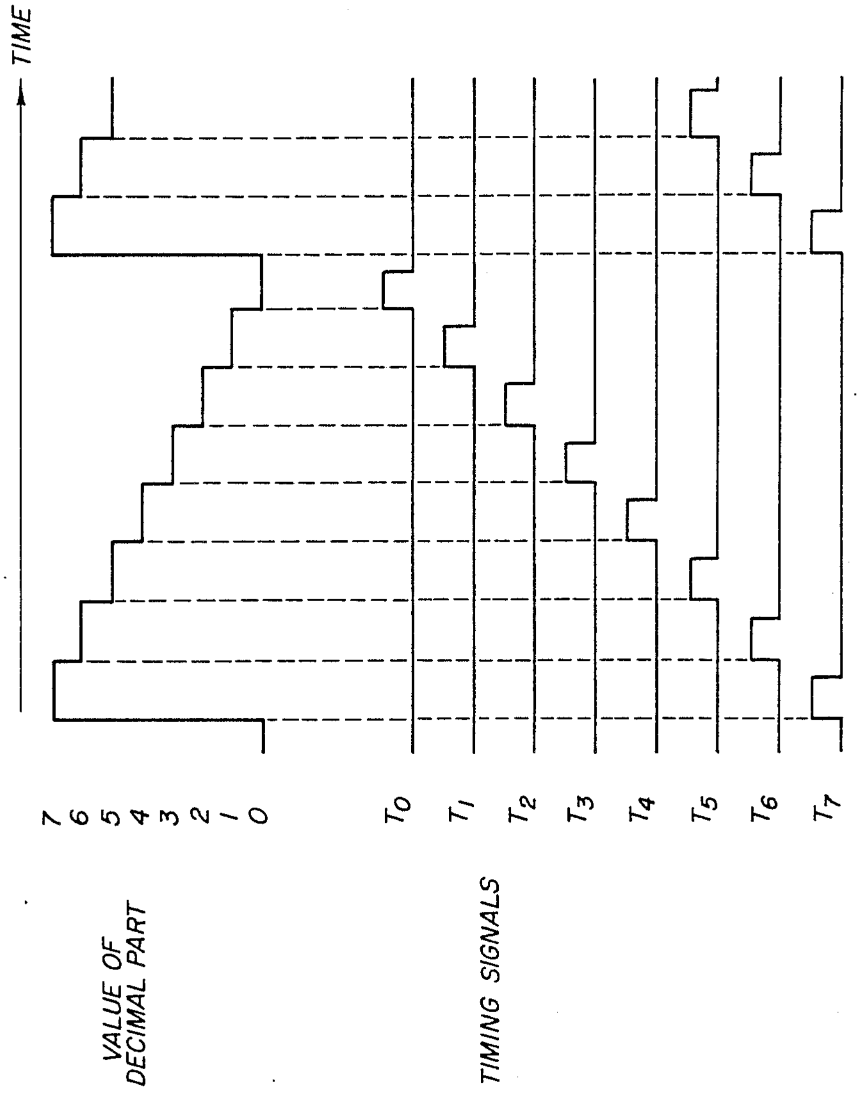
FIG. 3 is an explanatory diagram showing the relationship during reverse movement between outputs of a timing generator and the values of the coordinate counter decimal part.

FIG. 3 shows the relationship between the value of the decimal part of the output of coordinate counter 11 in the case of return scanning movement and $T_0$ to $T_7$. Since FIG. 3 is readily understandable from the explanation of FIG. 2, further explanation is omitted.

Further, the signals $T_0$ to $T_7$ formed in the timing generated circuit 12 are inputted into the timing selected circuits *9a* and *9b* which supply printing timing signals to the nozzle driving circuits 13M and 13C. The action of selecting one of the timing signals $T_0$ to $T_7$ is effected by the output signals of the decimal parts of the selectors *7a* and *7b*. In other words, the moments when the piezo driving circuits 13Y, 13M and 13C drive the piezo elements in dependence on the pixel data which has been set is given respectively by: $T_0$ for circuit 13Y; one of $T_0$ to $T_7$ selected by the timing selecting circuit *9a* for circuit 13M; and one of $T_0$ to $T_7$ selected by the timing selecting circuit *9b* for circuit 13C.

Figure 4:
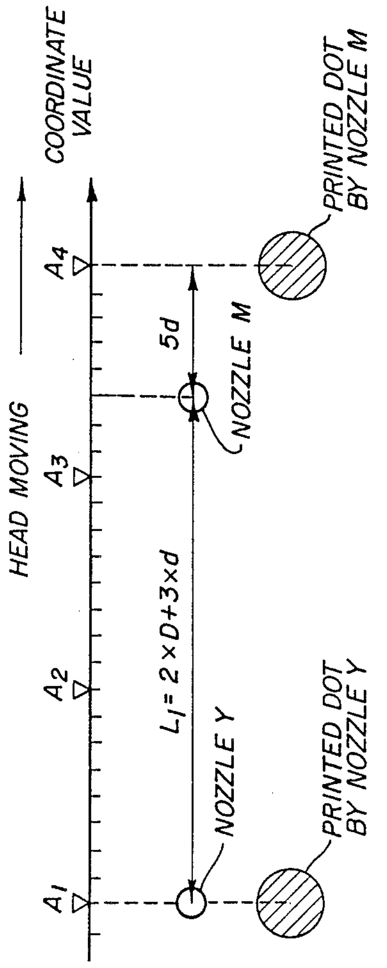
FIG. 4 is an explanatory diagram showing the relationship during forward movement, between the printed dot position and the nozzle arrangement.
Figure 5:
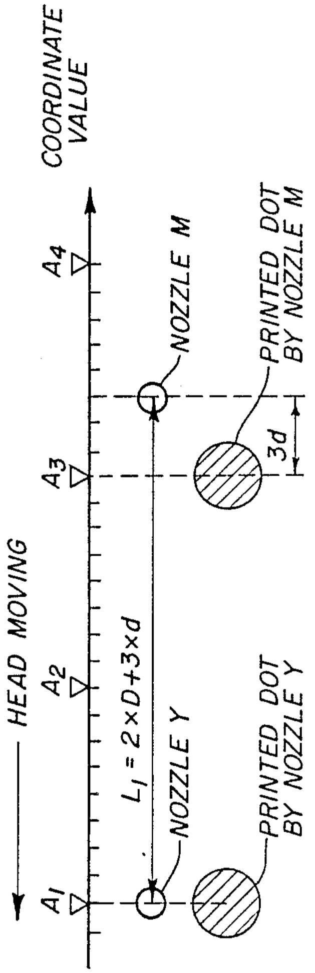
FIG. 5 is an explanatory diagram showing the relationship, during reverse movement, between the printed dot position and the nozzle arrangement.

Now, the manner of deriving the printing dot position correction will be explained in detail by reference to FIG. 4. At first, the coordinate of the scanning direction is scaled in units of d, and the mark v is located at a spacing of every 8 units. This is the position where the center of the printed dot should exist. However, the distance from reference nozzle 1Y to nozzle 1M is $L_1$ $(=2\times D+3\times d)$, when seen as to the nozzle 1M. Therefore, by assuming that the nozzle 1Y effects printing, for example, at the coordinate $A_1$, and when printing is also effected in the nozzle 1M, the printing position discrepancy of a distance of $5\times d$ occurs. Therefore, when the pixel data which should be printed by the nozzle 1Y at the coordinate $A_1$ is set in the piezo driving circuit 13Y, the pixel data to be printed at $A_4$ is set in the piezo driving circuit 13M. Then, when it is assumed that, at the time when the head displacement of $5\times d$ occurred after the printing action of the nozzle 1Y had been over, the printing with nozzle 1M is effected, the printing dot of the nozzle 1M is formed at the coordinate $A_4$. Also, during the return, or reverse, scanning movement, as shown in FIG. 5, the pixel data to be printed at the coordinate $A_1$ are set to the nozzle driving circuit 13Y as soon as the nozzle passes coordinate $A_2$, and at the time when the head displacement of $3\times d$ occurred after the printing with nozzle 1Y, the printing with nozzle 1M is effected, and thus, the printed dot of the nozzle 1M is formed at the coordinate $A_3$. A similar procedure is carried out for the nozzle 1C.

Figure 6:
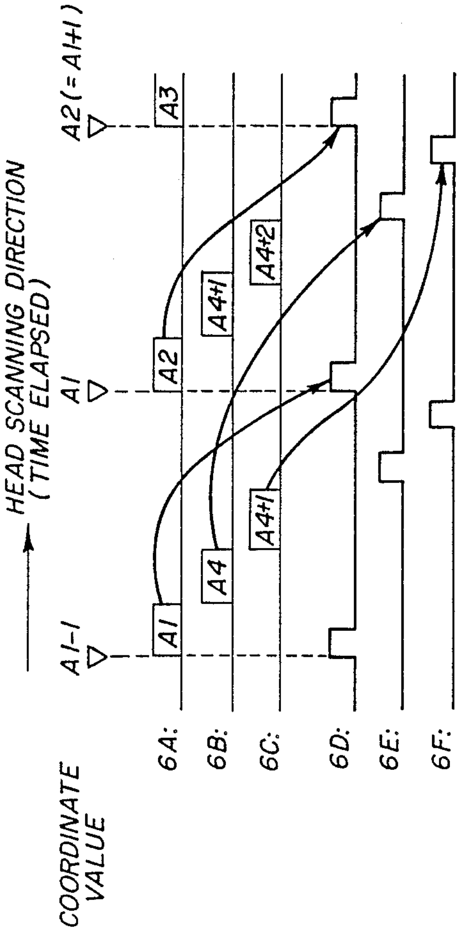
FIG. 6 is an explanatory diagram showing the sequence of the read out of the pixel data and the printing during forward movement.

The procedure for effecting the correction of the printing position will be made clear from an explanation of the whole performance sequence with reference to FIG. 6. FIG. 6 shows the sequence generated accompanying setting of a coordinate value for nozzle 1Y during a forward movement of the head. A1, A2, etc., in FIG. 6 are the same as those in FIGS. 4 and 5.

The sequence 6A shows the read out of the pixel data to be printed by the nozzle 1Y and setting it to the piezo driving circuit 13Y. The sequence 6B shows the read out of the pixel data to be printed by nozzle 1M and setting it to the piezo driving circuit 13M. The sequence 6C shows the read out of the pixel data to be printed by the nozzle 1C and setting it to the piezo driving circuit 13C. The sequence 6D shows printing by the nozzle 1Y synchronized with $T_0$ timing signal. The sequence 6E shows printing by the nozzle 1M synchronized with $T_5$ timing signal. The sequence 6F shows printing by the nozzle 1C synchronized with $T_7$ timing signal.

At first, an explanation will be given for the piezo driving circuit 13Y and the nozzle 1Y. When the nozzle 1Y reaches the position of $A1-1$, for indicating the integer part of the coordinate counter 11 the pixel data to be printed at the coordinate A1 are read out, and are kept and stored, and when the nozzle actually reaches A1, printing is effected in synchronization to $T_0$ in dependence on the pixel data. Therefore, although the explanation has been given up to now in such a manner that the read out address of the pixel of the nozzle 1Y is the integer part of the coordinate counter 11, from the above explanation it is clear that the address value A1 must be provided at the time when the nozzle is at the coordinate $A1-1$. As one technique for realizing the process, it is arranged in such a manner that the FOW/BKW signal is added to the input of the adder 5 to add a further one to the output.

By proceeding in such a manner, the address value A1 can be obtained when the value of the output of the integer part of the coordinate counter 11 is $A1-1$, and the address value of A2 $(=A1+1)$ when the value of the output of the integer part of the coordinate counter 11 is A1. Further, when FIG. 6 is seen in more detail, it is known that the reading out of the pixel data and the printing action progress in parallel.

Figure 7:
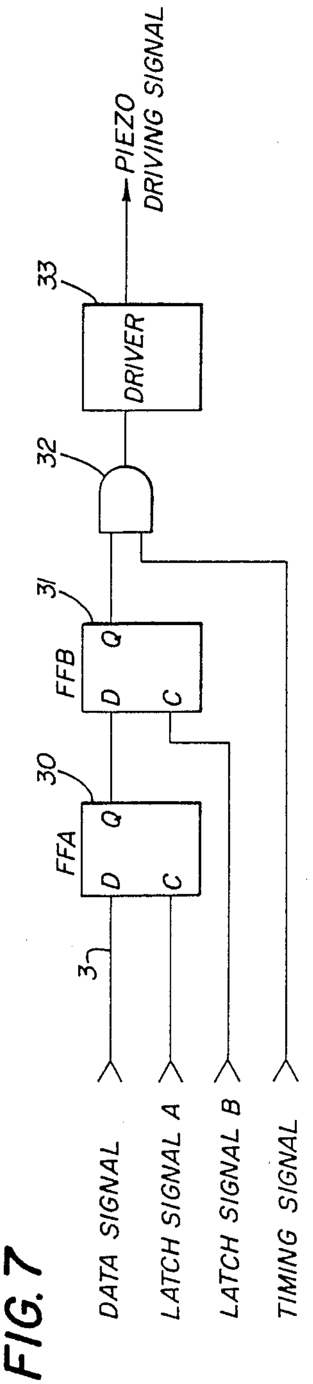
FIG. 7 is a circuitry block diagram of a piezo driver.

When the coordinate of the nozzle 1Y is at $A1-1$, the pixel data to be printed at the coordinate A1 is read, and when A1 is actually reached, the printing action thereof is effected, and together with that, the action of reading out the pixel to be printed at the coordinate A2 is effected. In order to realize this action, respective piezo driving circuits 13Y to 13C have the structure as shown in FIG. 7. The first flip flop FFA 30 latches the pixel data signal 3 by the latch signal A, and the second flip flop FFB 31 latches the output value of FFA 30 by the latch signal B, and keeps it.

When the printing timing signal is given, the driver 33 is activated through the output of FFB 31 and the AND gage 32 to generate the piezo driving signal.

Figure 8:
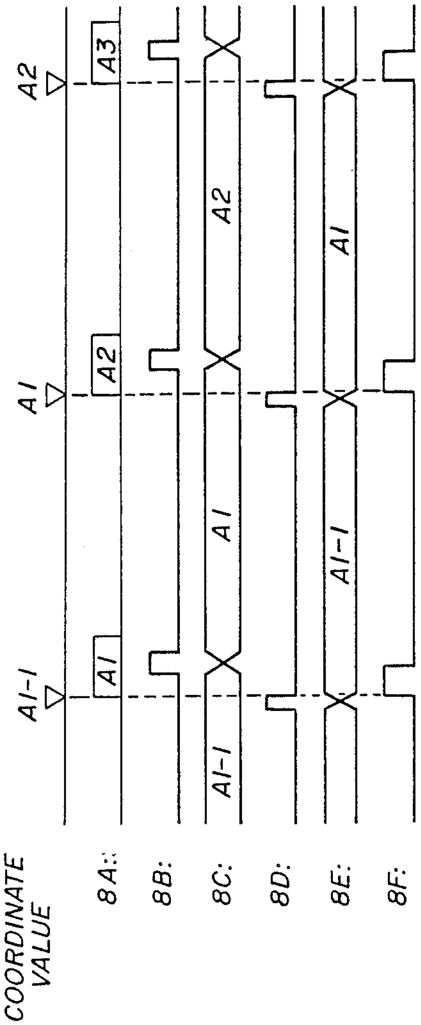
FIG. 8 is a timing chart showing the performance of the piezo driver.

FIG. 8 represents the performance sequence for nozzle 1Y, information from FIG. 6 and FIG. 7.

The sequence 8A shows the input of pixel data to the piezo driving circuit. The sequence 8B shows the latch signal A. The sequence 8C shows the Q output of the flip flop A. The sequence 8D shows the latch signal B. The sequence 8E shows the Q output of the flip flop B. The sequence 8F shows the printing timing signal of the nozzle 1Y.

When the coordinate A1−1 is reached, the read-out action of the pixel data to be printed at the coordinate A1 is started, and when the pixel data signal 3 has been stabilized, the control circuit latches it in FFA 30 by generating the latch signal A. Up to the time when the head scan has progressed to reach the coordinate A1, the output signal of the FFA 30 is latched in FFB 31 by generating the latch signal B. By carrying out such a procedure, the data of the FFA 30 is shifted into FFB 31, and it becomes possible that the setting of the printing and a new pixel data value are effected in a duplicated time zone when the coordinate A1 is reached. Although the latch signal should be generated in the respective data read out period of each nozzle 1Y, 1M and 1C, the latch signal B may be generated collectively in a predetermined timing such as, for example, at a timing when the decimal part of the coordinate counter 11 goes from the value 7 to the value 0.

On the premise of the above-described content, an explanation will be also given on the nozzle 1M and 1C also on the basis of FIG. 6 again. After the read out of the pixel data to the piezo driving circuit 13Y and the action of the set, the read out of pixel data of the piezo driving circuits 13M and 13C and the set action are successively generated. Respective actions are the same as the content explained in FIG. 8, and are set in respective piezo driving circuits in the timing of each latch signal A. Although the action time of this read out and the set is determined by the read out speed of the memory 2 and is not related to the scan speed of the head, it is necessary that it be finished at the latest by the time the head finishes the displacement by the dot pitch amount, as from the coordinate value A1−1 to A1, and from A1 to A2. The address value of the memory 2 in the time of the read out of this pixel data is such that, since the content of the correction registers 8*a* and 8*c* was (3, 5) and (4, 7), the address value is A1+3=A4 in the read out for the piezo driving circuit 13M, and A1+4=A4+1 in the read out for the piezo driving circuit 13C. The printing in dependence on the pixel data set in such a manner as described above is carried out at the position indicated with an arrow in the figure. For example, printing with nozzle 1M is effected in synchronization with $T_5$, generated at a part positioned in the rear for 5×d from the printing timing $T_0$ of the nozzle 1Y. This is clearly understood when it is considered by contrasting it to FIG. 4. Thus, the content read out by taking the address value of the memory 2 as A4 appears on the paper sheet surface when the nozzle 1M has actually reached the coordinate A4. When it is expressed over again, the so-called value 5 of the decimal part of the correction register 8*a* is a correction amount in units of d less than a dot pitch, and as the concrete action, it means that the printing position is displaced from the nozzle 1Y for an amount of distance of 5×d as shown in FIG. 6, and the printing timing $T_5$ is selected as the printing timing thereof. The above-described explanation can be similarly applied also to the piezo driving circuit 13C and the nozzle 1C, which fact can be readily understood when it is considered that the content of the correction register was (4, 7).

Figure 9:
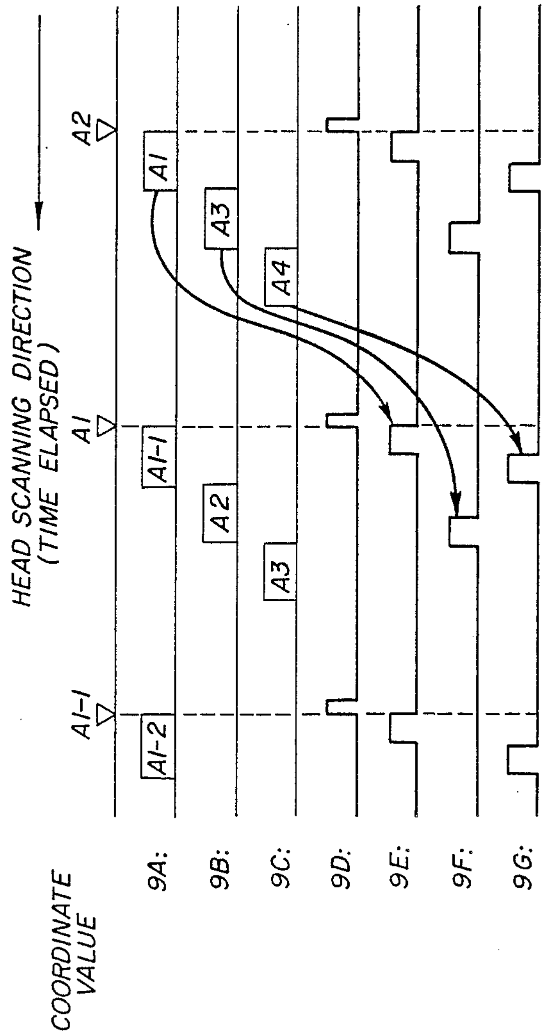
FIG. 9 is an explanatory diagram showing the sequence of read out of the pixel data and printing during reverse movement.

Next, the action sequence during reverse scanning movement will be explained on the basis of FIG. 9.

The sequence 9A shows the read out of the pixel data to be printed by the nozzle 1Y and setting it to the piezo driving circuit 13Y.

The sequence 9B shows the read out of the pixel data t be printed by the nozzle 1M and setting it to the piezo driving circuit 13M. The sequence 9C shows the read out of the pixel data to be printed by the nozzle 1C and setting it to the piezo driving circuit 13C. The sequence 9D shows the latch signal B. The sequence 9E shows printing by the nozzle 1Y synchronized with $T_0$ timing signal. The sequence 9F shows printing by the nozzle 1M synchronized with $T_3$ timing signal. The sequence 9G shows printing by the nozzle 1C synchronized with $T_1$ timing signal.

The pixel data to be printed at the coordinate A1 by the nozzle 1Y is read out when the nozzle moves past the coordinate A2. Since the output value of the integer part of the coordinate counter 11 also indicates A1, it will do that the adder 5 effects simple addition operation in the case of the return journey path. From this fact, it becomes clear that the FOW/BKW signal to the adder 5 may be handled as a so-called carry input signal.

Next, the read out address of the pixel data to the piezo driving circuit 13M is given as A1+2=A3, due to the fact that the content of the correction register 8*b* was (2, 3). Similarly, in the case of the piezo driving circuit 13C, the address is given as A1+3=A4, since the content of the correction register 8*b* was (3, 1). In such a manner as described above, the pixel data successively latched in FFA 30 are shunted into FFB 31 by the latch signal B. When the nozzle 1Y reaches the coordinate A1, printing with the nozzle 1Y is effected in the printing timing synchronized with $T_0$. *In the nozzle 1M, printing is effected synchronized with $T_3$* signal generated when the head displacement of the amount of 3×d was effected, since the content of the correction register had been (2, 3). This can be clearly understood by referring FIG. 5. This is also the same with the nozzle 1C.

Since the purpose of the present invention is the correction of the scanning direction of the head, the present invention is applicable in the case also where the three nozzles shown in the embodiment are obliquely arranged in the scanning direction. Also, the application of the present invention is not limited, even if the head comprises three nozzle rows arranged with separation distance in the scanning direction, or even if the number thereof is more than 3.

As has been explained above, the present invention has the following effects:

(1) The correction of an arbitrary nozzle interval can be carried out in the detecting resolution unit of the encoder.

(2) Since the correction is carried out by the position detection, high stability of the scanning speed of the head is not necessary.

(3) Since the correction standard is constant in the scan in the forward direction and in the reverse direction, stability of correction is high.

What is claimed is:

1. A printer driving circuit for a printer having a printer head which is mounted to scan perpendicularly to a direction in which a sheet to be printed upon is fed, the printer head including a plurality of dot printing means on said head to be separated from one another in the direction of head scanning, said printer driving circuit comprising:

detecting means for detecting the position of the head;

a picture memory for storing print data associated with at least one scan by the printer head at addresses corresponding to intended printed pixel locations on the sheet;

position generating means coupled with said detecting means for generating information related to respective positions of the printing means on the sheet;

read out means coupled with said detecting means for reading out the pixel data stored in said picture memory at addresses corresponding to the positions of the printing means relative to the sheet;

a timing generator coupled with said position generating means for generating a plurality of printing timing signals and having a timing selector to select one of said printing timing signals in accordance with said information related to respective positions of the printing means; and driving means coupled with said read out means and said timing generator for driving said printing means according to the pixel data read out by said read out means in response to the input of the selected timing signal.

2. A printer driving circuit as claimed in claim 1 wherein said printing means includes piezo driven ink-jet nozzles.

3. A printer driving circuit as claimed in claim 1 wherein said printing means comprise a plurality of nozzles, one said nozzle is a reference nozzle, and said detecting circuit detects the coordinate position of said reference nozzle as the head position.

4. A printer driving circuit as claimed in claim 1 wherein said detecting means comprises a counter for counting coordinate values associated with positions of the printer head in the direction of head scanning.

5. A printer driving circuit as claimed in claim 1 wherein said detecting means has a detector with a detecting resolution of 1/n of a printing dot pitch, wherein n is an integer greater than 1, and a counter constituted of a decimal counter part having a count capacity of n values and an integer counter part for counting the carrying overflow of the decimal counter part.

6. A printer driving circuit as claimed in claim 5 wherein said timing generator generates n different timing signals.

7. A printer driving circuit as claimed in claim 1 wherein said position generating means comprise storing means for a storing correction value for respective printing means.

8. A printer driving circuit as claimed in claim 7 wherein said storing means comprise a register for forward scanning movement and a register for reverse scanning movement for respective printing means.

9. A printer driving circuit as claimed in claim 1 wherein said position generating means comprise storing means for storing correction values including a register having an integer register part and a decimal register part for respective printing means.

10. A printer driving circuit as claimed in claim 9 wherein said position generating means comprise arithmetic operation means for producing representations of respective positions of said printing means from a coordinate value integer part and a correction value stored in said integer register part.

11. A printer driving circuit as claimed in claim 7 wherein the content of the decimal counter part is output to said timing selector.

12. A printer driving circuit as claimed in claim 1 wherein said position generating means comprise arithmetic operation means for generating representations of respective positions of said printing means from a coordinate value and a correction value.

13. A printer driving circuit as claimed in claim 1 wherein said driving means include a plurality of register means for storing read out pixel data.

14. A printer driving circuit as claimed in claim 1 wherein said plurality of printing means includes color printing means for printing color images.

15. A printer driving circuit as claimed in claim 14 wherein said picture memory stores print data at addresses corresponding to the printed pixel locations and color information of the pixel data.

16. A printer driving circuit as claimed in claim 15 wherein said position generating means includes means for generating color information.

17. A printer for printing a picture on a sheet comprising:

a printer head for printing a picture including a plurality of dot printing means;

a form feeder for feeding the sheet relative to said head;

printer head scanning means for moving said printer head across the sheet perpendicularly to the direction in which the sheet is fed by said feeder;

detecting means for detecting the position of the head relative to the sheet;

a picture memory for storing print data associated with at least one scan by the printer head at addresses corresponding to printed pixel locations on the sheet;

position generating means coupled with said detecting means for generating information related to respective positions of said printing means on the sheet;

read out means coupled with said detecting means for reading out the pixel data stored in said picture memory at addresses corresponding to the positions related to the printing means relative to the sheet;

a timing generator coupled with said position generating means for generating a plurality of printing timing signals having a timing selector to select one of said printing timing signals in accordance with the information related to respective positions of said printing means; and driving means coupled with said read out means and said timing generator for driving said printing means according to the pixel data read out by said read out means in response to the input of the selected timing signal.

18. A printer as claimed in claim 17 wherein said printing means includes piezo driven ink-jet nozzles.

19. A printer driving circuit as claimed in claim 17 wherein said printing means comprise a plurality of nozzles, one said nozzle is a reference nozzle, and said detecting means detects the coordinate position of said reference nozzle as the head position.

20. A printer as claimed in claim 17 wherein said detecting means comprises a counter for counting coordinate values associated with positions of the printer head in the direction of head scanning.

21. A printer as claimed in claim 17 wherein said detecting means has a detector with a detecting resolution of 1/n of a printing dot pitch, wherein n is an integer greater than 1, and a counter constituted of a decimal counter part having a capacity of n values and an integer counter part for counting the carry overflow of the decimal counterpart.

22. A printer as claimed in claim 21 wherein said timing generator generates n different timing signals.

23. A printer as claimed in claim 17 wherein said position generating means comprise storing means for storing a correction value for respective printing means.

24. A printer as claimed in claim 23 wherein said storing means comprise a register for the forward scanning movement and a register for the reverse scanning movement for respective printing means.

25. A printer as claimed in claim 17 wherein said position generating means comprise storing means for storing correction values including an integer register part and a decimal register part for respective printing means.

26. A printer as claimed in claim 25 wherein said position generating means comprise arithmetic operation means for generating representations of respective positions of said printing means from a coordinate value integer part and a correction value stored in said integer register part.

27. A printer as claimed in claim 25 wherein the content of the decimal counter part is output to said timing selector.

28. A printer as claimed in claim 17 wherein said position generating means comprise arithmetic operation means for generating representations of respective positions of said printing means from a coordinate value and a correction value.

29. A printer as claimed in claim 17 wherein said driving means include a plurality of register means for storing read out pixel data.

30. A printer as claimed in claim 17 wherein said plurality of printing means includes color printing means for printing color images.

31. A printer as claimed in claim 30 wherein said picture memory stores print data at addresses corresponding to the printed pixel locations and color information of the pixel data.

32. A printer as claimed in claim 31 wherein said position generating means includes means for generating color information.

33. A method for correcting dot discrepancy of a printer having a printer head which is mounted to scan perpendicularly to a direction in which a sheet to be printed upon is fed, the printer head including a plurality of dot printing means disposed in such arrangement on said head that they are separated from one another by respective distances in the direction of head scanning, said correcting method comprising steps of:

detecting the position of the head;

generating information related to positions of the printing means on the sheet;

reading out the pixel data stored in said picture memory at addresses corresponding to the positions of the printing means relative to the sheet;

generating a plurality of printing timing signals;

selecting one of the printing timing signals in accordance with said information related to respective positions of the printing means; and driving said printing means according to the pixel data read out in response to the selected timing signal.

* * * * *